(12) United States Patent
Ito et al.

(10) Patent No.: US 10,239,287 B2
(45) Date of Patent: Mar. 26, 2019

(54) MOLDING PACKAGING MATERIAL AND METHOD FOR PRODUCING SAME

(71) Applicants: Showa Denko Packaging Co., Ltd., Isehara-shi, Kanagawa (JP); TOAGOSEI CO., LTD., Minato-ku, Tokyo (JP)

(72) Inventors: Takahiro Ito, Takaoka (JP); Junya Komano, Takaoka (JP); Makoto Imahori, Takaoka (JP); Tetsunobu Kuramoto, Isehara (JP); Yuuji Minamibori, Isehara (JP)

(73) Assignees: SHOWA DENKO PACKAGING CO., LTD., Kanagawa (JP); TOAGOSEI CO., LTD., Tokyo (JP)

( * ) Notice: Subject to any disclaimer, the term of this patent is extended or adjusted under 35 U.S.C. 154(b) by 352 days.

(21) Appl. No.: 14/375,138

(22) PCT Filed: Jan. 11, 2013

(86) PCT No.: PCT/JP2013/050466
§ 371 (c)(1),
(2) Date: Jul. 29, 2014

(87) PCT Pub. No.: WO2013/114934
PCT Pub. Date: Aug. 8, 2013

(65) Prior Publication Data
US 2015/0004476 A1    Jan. 1, 2015

(30) Foreign Application Priority Data
Feb. 1, 2012   (JP) ................................ 2012-019811

(51) Int. Cl.
*B32B 15/085*   (2006.01)
*B32B 7/12*   (2006.01)
(Continued)

(52) U.S. Cl.
CPC .............. *B32B 15/085* (2013.01); *B32B 1/02* (2013.01); *B32B 7/12* (2013.01); *B32B 15/088* (2013.01);
(Continued)

(58) Field of Classification Search
CPC ..... H01M 2/0275; H01M 2/0287; H01M 2/02
(Continued)

(56) References Cited

U.S. PATENT DOCUMENTS 9,515,299 B2 * 12/2016 Kuramoto ................. B32B 7/12
2006/0025533 A1    2/2006 Komoto et al.
(Continued)

FOREIGN PATENT DOCUMENTS

CN    1581531 A    2/2005
CN    1610723 A    4/2005
(Continued)

OTHER PUBLICATIONS

Nimiya. JP 2002-321317. Nov. 5, 2002. English machine translation by EPO.*
(Continued)

*Primary Examiner* — James Lee
(74) *Attorney, Agent, or Firm* — Keating and Bennett, LLP

(57) ABSTRACT

A molding packaging material excellent in interlaminar lamination strength is provided, in which it is possible to prevent deterioration of the interlaminar strength due to influences of electrolytes and also possible to prevent deterioration of the interlaminar strength due to influences of heat generation and/or expansion/contraction of the packaging material caused by repetition of charging/discharging. The molding packaging material of the present invention includes a heat resistant resin layer 2 as an outer layer, a polypropylene layer 3 as an inner layer, a metal foil layer 5
(Continued)

arranged between the heat resistant resin layer and the polypropylene layer, wherein at least an inner side surface of the metal foil layer 4 is subjected to a chemical conversion treatment, and the polypropylene layer 3 is laminated on the chemical conversion treatment surface of the metal foil layer via an adhesive layer 5, wherein the adhesive layer 5 is formed by applying an adhesive to the chemical conversion treatment surface of the inner side surface of the metal foil layer 4, the adhesive containing at least an organic solvent, a polyolefin resin having a carboxyl group in which the organic solvent is dissolved and an MFR measured at 130° C. is 5 g/10 min to 42 g/10 min, and a multifunctional isocyanate compound.

14 Claims, 2 Drawing Sheets

(51) Int. Cl.

| | | |
|---|---|---|
| *B32B 15/20* | (2006.01) | |
| *H01M 2/02* | (2006.01) | |
| *B32B 27/08* | (2006.01) | |
| *B32B 37/12* | (2006.01) | |
| *B32B 15/088* | (2006.01) | |
| *B32B 27/32* | (2006.01) | |
| *B32B 1/02* | (2006.01) | |

(52) U.S. Cl.
CPC .............. *B32B 15/20* (2013.01); *B32B 27/08* (2013.01); *B32B 27/327* (2013.01); *B32B 37/12* (2013.01); *H01M 2/0275* (2013.01); *H01M 2/0287* (2013.01); *B32B 2307/306* (2013.01); *B32B 2307/518* (2013.01); *B32B 2323/10* (2013.01); *B32B 2439/00* (2013.01); *B32B 2439/70* (2013.01); *B32B 2439/80* (2013.01); *Y10T 428/31692* (2015.04)

(58) Field of Classification Search
USPC ......................................................... 429/176
See application file for complete search history.

(56) References Cited

U.S. PATENT DOCUMENTS

| | | | |
|---|---|---|---|
| 2006/0222849 A1 | 10/2006 | Matsumura et al. | |
| 2008/0286635 A1* | 11/2008 | Seino | B32B 7/12 429/94 |
| 2010/0015451 A1 | 1/2010 | Suzuta | |
| 2010/0255365 A1 | 10/2010 | Suzuta | |
| 2012/0064319 A1* | 3/2012 | Hata | H01M 2/0257 428/216 |
| 2013/0338284 A1* | 12/2013 | Ito | C09J 151/06 524/364 |

FOREIGN PATENT DOCUMENTS

| | | | | |
|---|---|---|---|---|
| CN | 1839163 A | 9/2006 | | |
| JP | 2000-129056 A | 5/2000 | | |
| JP | 2000-357494 A | 12/2000 | | |
| JP | 2001-172779 A | 6/2001 | | |
| JP | 2001-176457 A | 6/2001 | | |
| JP | 2001-277416 A | 10/2001 | | |
| JP | 2002-144479 | * 5/2002 | ............. | B32B 15/08 |
| JP | 2002-321317 | * 11/2002 | ............. | B32B 27/28 |
| JP | 2006-015605 A | 1/2006 | | |
| JP | 2008-210777 A | 9/2008 | | |
| JP | 2008-230198 A | 10/2008 | | |
| JP | 2010-092703 A | 4/2010 | | |
| JP | 2010-254276 A | 11/2010 | | |
| JP | 2012-001661 A | 1/2012 | | |
| JP | 2012-12088 A | 1/2012 | | |
| WO | 2009/041077 A1 | 4/2009 | | |
| WO | 2009/087776 A1 | 7/2009 | | |
| WO | WO 2012/090646 | * 7/2012 | ............. | C09J 123/26 |
| WO | 2012/133663 A1 | 10/2012 | | |
| WO | 2012/133683 A1 | 10/2012 | | |

OTHER PUBLICATIONS

"MODIC Grade" Mitsubishi Chemical. <http://www.mcc-spd.com/product/modic/modic_grade.pdf>.*
Hiromitsu. JP 2002-144479. May 2002. English machine translation by JPO.*
Official Communication issued in International Patent Application No. PCT/JP2013/050466, dated Mar. 26, 2013.
"Plastic Film, Resin Material Guidebook 2001", Jun. 26, 2000; pp. 158-159.
Table of MODIC Grade showing the grade of MODIC, a polyolefin series adhesive resin of Mitsubishi Chemical Corporation.

* cited by examiner

MOLDING PACKAGING MATERIAL AND METHOD FOR PRODUCING SAME

TECHNICAL FIELD

The present invention relates to a packaging material preferably used as a case for a secondary battery for use in, e.g., laptop computers, mobile phones, automobiles, or for a stationary type lithium ion secondary battery, and also preferably used as a packaging material for, e.g., food products or pharmaceutical products.

In this specification, "a polyolefin resin having a carboxyl group" may be referred to as "a polyolefin resin containing a carboxyl group," and "a polypropylene resin having a carboxyl group" may be referred to as "a polypropylene resin containing a carboxyl group."

Further, in this specification, a "melting point" of a resin is referred to as a peak temperature (melting point) measured by a method stipulated in JIS K7121 (1987) "Transition Temperature Measuring Method of Plastic" by a DSC (differential scanning calorimeter) at a temperature raising rate of 10° C./min.

Further, in this specification, a "MFR (melt flow rate)" of a resin is a value measured on the measurement condition of 130° C. and 2.16 kg load (21.18 N) according to JIS K7210 (1999 Revised version).

TECHNICAL BACKGROUND

A laminate packaging material using a metal foil having good barrier characteristics for oxygen or moisture to prevent chemical change, deterioration, and corrosion, etc., of contents of foods, pharmaceutical products, etc., in the packaging material, has been widely known.

On the other hand, with the reduction in size and weight of various electronic equipment such as OA devices such as personal computers, mobiles phones, game machines, headphone stereos, electronic notebooks, etc., as a battery for a power supplying unit, lithium ion polymer secondary batteries have become increasingly used from the view point of the reduction in size and weight. In a lithium ion polymer secondary battery, when the electrolyte in the battery reacts with water to thereby form a hydrofluoric acid, the performance of the battery may deteriorate or leakage may occur due to corrosion of the aluminum foil. Therefore, as a material for use in a case (accommodation case) for lithium ion polymer secondary batteries, a laminate packaging material high in sealing performance using a metal foil excellent in moisture barrier properties has become used.

As a material for use in a case for lithium ion polymer secondary batteries (packaging material), a laminate packaging material is used, in which an outer layer made of a heat resistant resin film, an intermediate layer made of an aluminum foil as a moisture barrier layer, and an inner layer made of a polyolefin film for sealing polymer electrolytes as contents are integrally laminated.

The aforementioned laminate packaging material is formed into a three-dimensional cuboid shape, etc., by bulging or deep drawing to increase the capacity for filling polymer electrolytes as much as possible, to thereby produce a battery case.

As a production method of the laminate packaging material, the following methods are known. According to one of the methods, in a laminate forming an emboss type exterior body constituted by at least a base material layer, an adhesive layer, a chemical conversion treatment layer, an aluminum, a chemical conversion treatment layer, an acid modified PP film layer, an extruded resin layer, and an innermost layer, both surfaces of the aluminum is subjected to a chemical conversion treatment and the base material layer is adhered to one of the surfaces of the aluminum by a dry lamination method, then an acid modified PP is applied to the other chemical conversion treatment surface and baked thereto, and then the acid modified PP surface and the innermost layer (cast PP) are laminated with an extruded resin by a sandwich lamination method (see Patent Document 1). According to the other method, in a lamination forming an emboss type exterior body constituted by at least a base material layer, an adhesive layer, a chemical conversion treatment layer, an aluminum, a chemical conversion treatment layer, an acid modified PP film layer, an extruded resin layer, and an innermost layer, one surface of the aluminum is subjected to a chemical conversion treatment, and the base material layer is adhered to the chemical conversion treatment surface by a dry lamination method, then the non-processed surface of the aluminum is subjected to a chemical conversion treatment, an acid modified PP is applied to the chemical conversion treatment surface and baked thereto, and then the acid modified PP surface and the innermost layer (cast PP) are laminated with an extruded resin by a sandwich lamination method (see Patent Document 1).

Furthermore, other methods are also known. According to one of the methods, in a laminate forming an emboss type exterior body constituted by at least a base material layer, an adhesive layer, a chemical conversion treatment layer, an aluminum, a chemical conversion treatment layer, an acid modified PP film layer, and an innermost layer, both surfaces of the aluminum are subjected to a chemical conversion treatment, one of the chemical conversion treatment surfaces and the base material are laminated by a dry lamination method, then an acid modified PP is applied to the other chemical conversion treatment surface and baked thereto, and then the innermost layer is laminated to the acid modified PP surface (see Patent Document 2). According to the other method, in a laminate forming an emboss type exterior body constituted by at least a base material layer, an adhesive layer, a chemical conversion treatment layer, an aluminum, a chemical conversion treatment layer, an acid modified PP film layer, and an innermost layer, one surface of the aluminum is subjected to a chemical conversion treatment, the chemical conversion treatment and the base material are laminated by a dry lamination method, then the other surface of the aluminum is subjected to a chemical conversion treatment and then an acid modified PP is applied and baked thereto, thereafter a cast polypropylene is laminated on the acid modified PP surface by a heat laminating method (see Patent Document 2).

Another production method is also known, in which an organosol having an acid-modified polyolefin as a solid content is applied to a chromic chemical conversion treatment film surface of a metal foil made of a metal foil main body and a chromic chemical conversion treatment film formed by subjecting at least one surface of the metal foil main body to a chromate treatment, then the organosol is dried to form an adhesive film, thereafter an acid-modified polyolefin film of the same kind as the acid-modified polyolefin in the organosol is pressure-bonded to the adhesive film to adhere the metal foil and the acid-modified polyolefin film to thereby make the acid-modified polyolefin film as a heat-sealing layer (see Patent Document 3.)

PRIOR ART DOCUMENTS

Patent Documents

Patent Document 1: Japanese Unexamined Patent Application Publication No. 2001-172779
Patent Document 2: Japanese Unexamined Patent Application Publication No. 2001-176457
Patent Document 3: Japanese Unexamined Patent Application Publication No. 2000-357494

SUMMARY OF THE INVENTION

Problems to be Solved by the Invention

However, in any of the aforementioned conventional technologies, the lamination strength between the metal foil layer and the innermost layer (inner layer; sealant layer) was not sufficient enough.

The present invention was made in view of the aforementioned technical background, and aims to provide a molding packaging material excellent in interlaminar strength capable of preventing deterioration of the interlaminar strength due to influences of electrolytes and also capable of preventing deterioration of the interlaminar strength due to influences of heat generation and/or expansion/contraction of a packaging material caused by repetition of charging/discharging, and also to provide a production method capable of producing a molding packaging material excellent in interlaminar strength with a high productivity.

Means to Solve the Problems

To achieve the aforementioned objects, the present invention provides the following means.

1. A molding packaging material comprising:
a heat resistant resin layer as an outer layer;
a polypropylene layer as an inner layer; and
a metal foil layer arranged between the heat resistant resin layer and the polypropylene layer,
wherein at least an inner side surface of the metal foil layer is subjected to a chemical conversion treatment, and the polypropylene layer is laminated on the chemical conversion treatment surface of an inner side of the metal foil layer via an adhesive layer, and
wherein the adhesive layer is formed by applying an adhesive to the chemical conversion treatment surface of the inner side of the metal foil layer, the adhesive containing at least an organic solvent, a polyolefin resin having a carboxyl group dissolved in the organic solvent and having an MFR of 5 g/10 min to 42 g/10 min measured at 130° C., and a multifunctional isocyanate compound.

2. The molding packaging material as recited in the aforementioned Item 1, wherein the adhesive further contains a polyolefin resin having a carboxyl group and having a melting point of 120° C. to 170° C. in a manner dispersed in the organic solvent.

3. The molding packaging material as recited in the aforementioned Item 1 or 2, wherein the adhesive layer is formed by applying the adhesive on the chemical conversion treatment surface of the inner side of the metal foil layer and thereafter subjecting the applied adhesive to a baking treatment.

4. The molding material as recited in the aforementioned Item 3, wherein the polypropylene layer is formed with an extrusion lamination method by laminating a polypropylene on an inner side surface of the adhesive layer formed by the baking treatment.

5. The molding packaging material as recited in any one of the aforementioned Items 1 to 4, wherein the polypropylene layer as the inner layer is constituted by a copolymer resin containing at least propylene and ethylene as a copolymerization component, having a melting point of 135° C. to 155° C. and having an MFR of 6 g/10 min to 25 g/10 min measured at 230° C.

6. The molding packaging material as recited any one of the aforementioned Items 1 to 5, wherein the molding packaging material is used as a battery case.

7. The molding packaging material as recited in any one of the aforementioned Items 1 to 5, wherein the molding packaging material is used as a packaging material for foods or pharmaceutical products.

8. A production method of a molding packaging material, comprising:
a step of adhering a heat resistant resin film on one surface of a metal foil with a second adhesive;
a step of forming a first adhesive layer by applying a first adhesive on the other surface of the metal foil, wherein the first adhesive contains at least an organic solvent, a polyolefin resin having a carboxyl group dissolved in the organic solvent and having an MFR of 5 g/10 min to 42 g/10 min measured at 130° C., and a multifunctional isocyanate compound; and
a step of laminating a polypropylene layer as an inner layer on a non-laminated surface of the first adhesive layer,
wherein as the metal foil, a metal foil in which a surface of the metal foil to which at least the first adhesive is to be applied is subjected to a chemical conversion treatment is used.

9. The production method of a molding packaging material as recited in the aforementioned Item 8, wherein the first adhesive further contains a polyolefin resin having a carboxyl group and having a melting point of 120° C. to 170° C. in a manner dispersed in the organic solvent.

10. The production method of a molding packaging material as recited in the aforementioned Items 8 or 9, wherein after applying the first adhesive, the first adhesive is heated to perform baking to thereby form the first adhesive layer.

11. The production method of a molding packaging material as recited in any one of the aforementioned Items 8 to 10, wherein as a polypropylene of the inner layer, a copolymer resin containing at least propylene and ethylene as a copolymerization component, having a melting point of 135° C. to 155° C. and having an MFR of 6 g/10 min to 25 g/10 min measured at 230° C.

Effects of the Invention

According to the invention as recited in the aforementioned item (1), a polypropylene layer is laminated on the chemical conversion treatment surface of the inner side of the metal foil layer, and the adhesive layer is formed by applying an adhesive to the chemical conversion treatment surface of the inner side of the metal foil layer, wherein the adhesive contains at least an organic solvent, a polyolefin resin having a carboxyl group dissolved in the organic solvent and having an MFR of 5 g/10 min to 42 g/10 min measured at 130° C., and a multifunctional isocyanate compound. Therefore, the interlaminar strength can be sufficiently secured. Furthermore, the adhesive is excellent in affinity to both the metal foil layer and the polypropylene layer (inner layer), so the interlaminar strength between the metal foil layer and the polypropylene layer (inner layer) can be further improved. Therefore, when used as, e.g., a battery case, it is possible to prevent deterioration of the interlaminar strength due to the influence of electrolytes, and also possible to prevent deterioration of the interlaminar strength due to the influence of heat generation and/or expansion/contraction of the packaging material caused by repetition of charging/discharging, which enables secure sufficient sealing performance. Further, since at least one surface of the metal foil layer is subjected to a chemical conversion treatment, corrosion of the surface of the metal foil by the contents (electrolytes of batteries, food products, pharmaceutical products, etc.) can be sufficiently prevented.

According to the invention as recited in the aforementioned item (2), since the adhesive further contains a polyolefin resin having a carboxyl group and having a melting point of 120° C. to 170° C. in a manner dispersed in the organic solvent, the interlaminar strength, the electrolyte resistance, and the sealing performance can further be improved.

According to the invention as recited in the aforementioned item (3), since the adhesive layer is formed by applying the adhesive and thereafter subjecting the applied adhesive to a baking treatment, there is an advantage that it can be once wound up for the next processing.

According to the invention as recited in the aforementioned item (4), since the polypropylene layer is formed with an extrusion lamination method by laminating a polypropylene on an inner side surface of the adhesive layer formed by the baking treatment, the interlaminar strength between the metal foil layer and the polypropylene layer (inner layer) can be further improved.

According to the invention as recited in the aforementioned item (5), since the polypropylene layer (inner layer) is formed by a copolymer resin containing at least propylene and ethylene as a copolymerization component, having a melting point of 135° C. to 155° C. and having an MFR of 6 g/10 min to 25 g/10 min measured at 230° C., sufficient heat resistance can be secured, an appropriate fluidity can be realized at the time of sealing, and excellent sealing performance can be secured.

According to the invention as recited in the aforementioned item (6), a material for a battery case having a large interlaminar strength can be provided.

According to the invention as recited in the aforementioned item (7), a food packaging material having a large interlaminar strength or a pharmaceutical product packaging material having a large interlaminar strength can be provided.

According to the invention as recited in the aforementioned item (8), since the method includes a step of adhering a heat resistant resin film on one surface of a metal foil with a second adhesive, a step of forming a first adhesive layer by applying a first adhesive on the other surface of the metal foil, wherein the first adhesive contains at least an organic solvent, a polyolefin resin having a carboxyl group dissolved in the organic solvent and having an MFR of 5 g/10 min to 42 g/10 min measured at 130° C., and a multifunctional isocyanate compound, and a step of laminating a polypropylene layer as an inner layer on a non-laminated surface of the first adhesive layer, wherein as the metal foil, a metal foil in which a surface of the metal foil to which at least the first adhesive is to be applied is subjected to a chemical conversion treatment is used, and therefore a molding packaging material capable of sufficiently securing the interlaminar strength can be produced. Furthermore, the first adhesive layer is excellent in affinity to both the metal foil layer and the polypropylene layer (inner layer), so the interlaminar strength between the metal foil layer and the polypropylene layer (inner layer) can be further improved. Therefore, when the obtained molding packaging material is formed into, e.g., a battery case, it is possible to prevent deterioration of the interlaminar strength due to the influence of electrolytes, and also possible to prevent deterioration of the influence of heat generation and/or expansion/contraction of the packaging material caused by repetition of charging/discharging, which enables secure sufficient sealing performance. Further, since at least a surface of the metal foil layer to which the first adhesive is to be applied is subjected to a chemical conversion treatment, a molding packaging material capable of preventing corrosion of the surface of the metal foil by the contents (electrolytes of batteries, food products, pharmaceutical products, etc.) can be produced.

According to the invention as recited in the aforementioned item (9), since the first adhesive further contains a polyolefin resin having a carboxyl group and having a melting point of 120° C. to 170° C. in a manner dispersed in the organic solvent, the interlaminar strength, the electrolyte resistance, and the sealing performance can further be improved.

According to the invention as recited in the aforementioned item (10), since the first adhesive layer is formed by applying the first adhesive and then heating to thereby bake the first adhesive, there is an advantage that it can be once wound up for the next processing.

According to the invention as recited in the aforementioned item (11), as a polypropylene (inner layer), a copolymer resin containing at least propylene and ethylene as a copolymerization component, having a melting point of 135° C. to 155° C. and having an MFR of 6 g/10 min to 25 g/10 min measured at 230° C., and therefore, a molding packaging material having sufficient heat resistance capable of realizing an appropriate fluidity at the time of sealing and securing excellent sealing performance can be produced.

EMBODIMENTS FOR CARRYING OUT THE INVENTION

Figure 1:
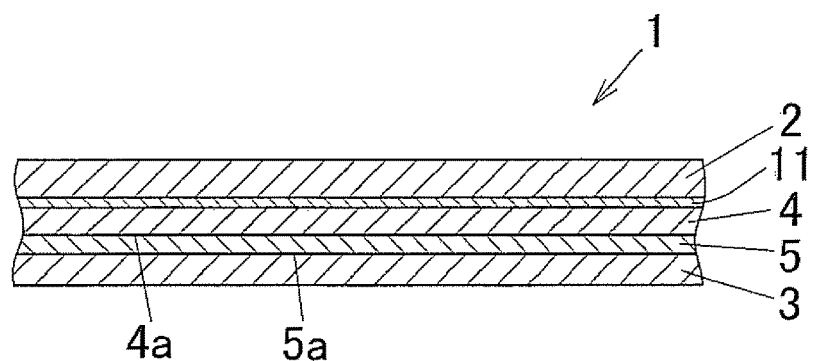
FIG. 1 is a cross-sectional view showing an embodiment of a molding packaging material according to the present invention.

An embodiment of a molding packaging material 1 according to the present invention is shown in FIG. 1. This molding packaging material 1 is formed into, for example, an approximately rectangular parallelepiped shape with an opened upper surface, and used as a case for lithium ion polymer secondary batteries.

In the molding packaging material 1, a heat resistant resin layer (outer layer) 2 is integrally laminated on one of the surfaces of a metal foil layer 4 via a second adhesive layer 11, and a polypropylene layer (inner layer) 3 is integrally laminated on the other surface of the metal foil layer 4 via a first adhesive layer 5.

At least the inner side surface 4a of the metal foil layer 4 (surface on the side of the polypropylene layer 3) is subjected to a chemical conversion treatment, and the first adhesive layer 5 is laminated on the chemical conversion treatment surface 4a on the inner side surface of the metal foil layer 4.

The first adhesive layer 5 is formed by applying a first adhesive to the chemical conversion treatment surface 4a on the inner side of the metal foil layer 4. The first adhesive contains:

(A) an organic solvent;
(B) a polyolefin resin having a carboxyl group dissolved in the organic solvent and having an MFR (melt flow rate) of 5 g/10 min to 42 g/10 min measured at 130° C.; and
(C) a multifunctional isocyanate compound.

In this embodiment, the first adhesive layer 5 is formed by applying the first adhesive on the chemical conversion treatment surface 4a on the inner side surface of the metal foil layer 4 and thereafter subjecting the applied adhesive to a baking treatment.

Furthermore, in this embodiment, the polypropylene layer (inner layer) 3 is formed by laminating polypropylene to the inner side surface 5a of the first adhesive layer 5 formed by the baking by an extrusion lamination method.

In the molding packaging material 1 having the aforementioned constitution, a polypropylene layer 3 is laminated on the chemical conversion treatment surface 4a on the metal foil layer 4 via an adhesive layer 5, and the first adhesive layer 5 is formed by applying a first adhesive to the chemical conversion treatment surface 4a on the inner side of the metal foil layer, the adhesive containing at least an organic solvent, a polyolefin resin having a carboxyl group dissolved in the organic solvent and having an MFR of 5 g/10 min to 42 g/10 min measured at 130° C., and a multifunctional isocyanate compound, and that the first adhesive is excellent in affinity to both the metal foil layer 4 and the polypropylene layer (inner layer) 3. Therefore, the interlaminar strength between the metal foil layer 4 and the polypropylene layer (inner layer) 3 can be sufficiently improved. For this reason, when the packaging material 1 is formed into, e.g., a battery case, it is possible to prevent deterioration of the interlaminar strength due to the influence of electrolytes, and also possible to prevent deterioration of the interlaminar strength due to the influence of heat generation and/or expansion/contraction of the packaging material caused by repetition of charging/discharging, which enables secure sufficient sealing performance.

Figure 2:
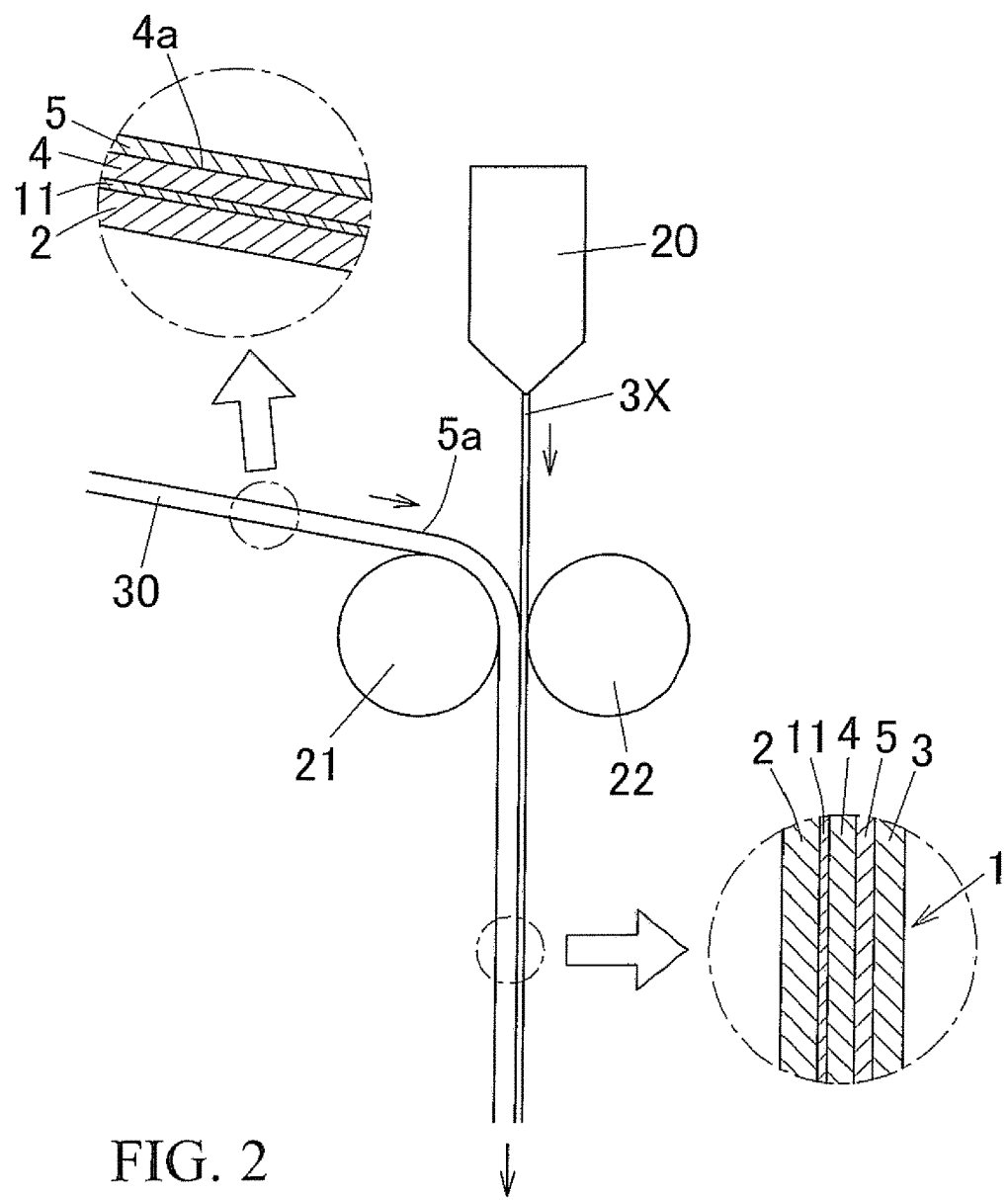
FIG. 2 is a side view showing an example of a production method of a molding packaging material according to the present invention.
Figure 3:
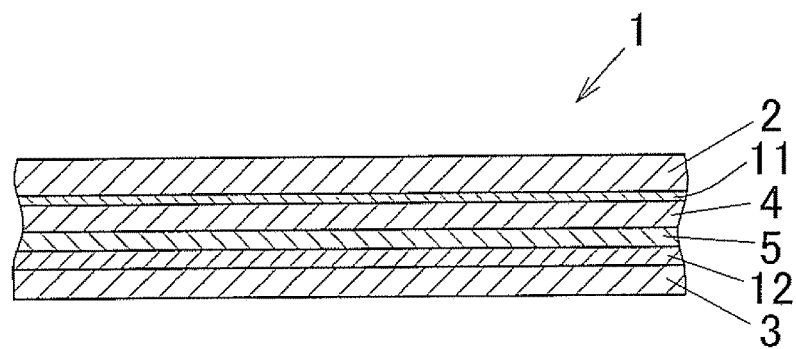
FIG. 3 is a cross-sectional view showing another embodiment of a molding packaging material according to the present invention.

Next, an example of a method for producing a molding packaging material 1 according to the present invention will be explained with reference to FIG. 2. Initially, a heat resistant resin stretched film (heat resistant resin layer) 2 is adhered to one surface of the metal foil 4 with a second adhesive 11 (Adhesion step). For example, the adhesion is performed by a dry lamination method. As the metal foil 4, a metal foil in which at least the inner side surface 4a (surface on a side to which the first adhesive used in the next step is applied) is subjected to a chemical conversion treatment is used. At this time, a metal foil 4 having both surfaces subjected to a chemical conversion treatment can be used.

On the other surface 4a (inner side surface) of the metal foil 4, a first adhesive is applied and then dried to thereby form a first adhesive layer 5. The first adhesive contains at least:

(A) an organic solvent;
(B) a polyolefin resin having a carboxyl group dissolved in the organic solvent and having an MFR (melt flow rate) of 5 g/10 min to 42 g/10 min measured at 130° C.; and
(C) a multifunctional isocyanate compound.

It is preferable that the first adhesive layer 5 is formed by applying the first adhesive and then applying heat to perform baking thereof (Baking processing step). A laminate 30 is obtained in this way (see FIG. 2).

A method for applying the first adhesive (processing solution) is not especially limited, but for example, a gravure roll method can be exemplified.

It is preferable that the heating temperature for the baking treatment is set to 80° C. to 250° C. By setting to 80° C. or higher, the adhesiveness of the first adhesive layer 5 to the metal foil 4 can be sufficiently secured, and by setting to 250° C. or lower, the deterioration of the first adhesive layer 5 can be controlled.

Next, a polypropylene layer 3 is laminated on a non-laminated surface 5a of the first adhesive layer 5 of the laminate 30 by an extrusion lamination method (Extrusion lamination step). At the time of the extrusion lamination, as shown in FIG. 2, the laminate 30 and the extruded polypropylene 3X are pinched by a rubber roll 21 and a cooling roller 22 (see FIG. 2) to thereby obtain a molding packaging material 1 of the present invention as shown in FIG. 1.

The materials of the surface of the cooling roller 22 is not especially limited, but for example, general materials such as stainless steel, etc., can be used.

The heat resistant resin layer (outer layer) 2 is not especially limited, but for example, a nylon film, a polyester film, etc., can be exemplified, and stretched films thereof are preferably used. Above all, as the heat resistant resin layer 2, it is especially preferable to use a biaxially stretched nylon film, a biaxially stretched polybutylene terephthalate (PBT) film, a biaxially stretched polyethylene terephthalate (PET) film or a biaxially stretched polyethylene naphthalate (PEN) film. The nylon film is not especially limited, but for example, a nylon 6 film, a nylon 6,6 film, an MXD nylon film, etc., can be exemplified. Also, the heat resistant resin layer 2 can be formed by a single-layer or a multi-layer made of, e.g., PET film/nylon film.

It is preferable that the thickness of the heat resistant resin layer 2 is 12 μm to 50 μm. When using a polyester film, it is preferable that the thickness is 12 μm to 50 μm, and when using a nylon film, it is preferable that the thickness is 15 μm to 50 μm. By setting the thickness to the suitable lower limit or more, sufficient strength can be secured as a packaging material, and by setting the thickness to the suitable upper limit or less, the stress at the time of bulging or drawing can be decreased to thereby improve the formability.

The metal foil layer 4 plays the role of giving gas barrier characteristics for preventing invasion of oxygen and/or moisture into the molding packaging material 1. The metal foil layer 4 is not especially limited, but for example, an aluminum foil, a copper foil, etc., can be exemplified, and an aluminum foil is generally used. It is preferable that the thickness of the metal foil layer 4 is 20 μm to 100 μm. By setting the thickness to 20 μm or more, generation of pinholes at the time of rolling when producing the metal foil can be prevented, and by setting the thickness to 100 μm or less, the stress at the time of bulging or drawing can be decreased to thereby improve the formability.

In the metal foil layer 4, at least the inner side surface 4a (surface on the side of the first adhesive layer 5) is subjected to a chemical conversion treatment. By being subjected to such a chemical conversion treatment, corrosion of the surface of the metal foil by contents (electrolytes of batteries, food products, pharmaceutical products, etc.) can be sufficiently prevented. For example, the metal foil is subjected to a chemical conversion treatment by the following treatment. That is, for example, on a surface of a metal foil to which a decreasing treatment was subjected, 1) an aqueous solution of a mixture of phosphoric acid, chromic acid and metal salt of fluoride;

2) an aqueous solution of a mixture of phosphoric acid, chromic acid, and metal salt and non-metal salt of fluoride; and 3) an aqueous solution of a mixture of an acrylic resin and/or a phenolic resin, phosphoric acid, chromic acid, and fluoride metal salt are applied, and then dried to thereby perform a chemical conversion treatment.

The first adhesive layer 5 is a film (coating film) formed by applying a first adhesive (processing solution) to the chemical conversion treatment surface on the inner side of the metal foil layer 4 and then drying it. The first adhesive contains:

(A) an organic solvent;

(B) a polyolefin resin having a carboxyl group dissolved in the organic solvent and having an MFR (Melt Flow Rate) of 5 g/10 min to 42 g/10 min measured at 130° C.; and (C) a multifunctional isocyanate compound.

It is preferable that the film (coating film) is formed by performing a baking treatment by heating after applying the first adhesive (processing solution).

Furthermore, it is preferable that the first adhesive (processing solution) has a constitution containing (D) a polyolefin resin having a carboxyl group dispersed in the organic solvent and having a melting point of 120° C. to 170° C.

It is preferable that the organic solvent (A component) constituting the first adhesive (processing solution) is an organic solvent easy to be evaporated and removed by, e.g., heating the adhesive composition. As such an organic solvent, an aromatic organic solvent such as toluene, xylene, etc., an aliphatic organic solvent such as n-hexane, etc., an alicyclic organic solvent such as cyclohexane, methyl cyclohexane, etc., a ketone-based organic solvent such as methyl ethyl ketone, etc., an alcohol-based organic solvent such as ethanol, isopropyl alcohol, etc., can be exemplified. For such an organic solvent, only one kind thereof can be used or two or more kinds thereof can be combined.

Above all, it is preferable that the organic solvent (A component) has a constitution including at least an alcohol-based organic solvent (ethanol, isopropyl alcohol, etc.), and in this case, the storage stability of the adhesive can be improved. Furthermore, it is preferable that the content ratio of the alcohol-based organic solvent for the total amount of the organic solvent is set to be 0.1 mass % to 20 mass %, and above all, it is especially preferable that it is set to 0.3 mass % to 10 mass %.

As the polyolefin resin (B component, D component) having a carboxyl group, for example, polyolefin modified by unsaturated carboxylic acid and/or derivative thereof, etc., can be exemplified. As the modification, a graft addition modification, etc., can be exemplified.

The unsaturated carboxylic acid and derivatives of the unsaturated carboxylic acid are not especially limited, but for example, acrylic acid, methacrylic acid, maleic anhydride, maleic acid, fumaric acid, crotonic acid, itaconic acid, citraconic acid, 5-norbornene-2,3-dicarboxylic acid, etc., can be exemplified. For such ethylenic unsaturated carboxylic acid, only one kind thereof can be used or two or more kinds thereof can be combined.

Above all, it is preferable to use polypropylene graft addition modified by at least one kind of a compound selected from the group consisting of maleic anhydride, maleic acid, fumaric acid, acrylic acid and methacrylic acid, and polypropylene graft addition modified by maleic anhydride is especially suitable.

The production method of the polyolefin resin (B component, D component) having a carboxyl group is not especially limited, but for example, a solution method in which polypropylene is dissolved in an organic solvent and reacted with carboxylic acid (maleic anhydride, etc.) in the presence of a radical generator, and a fusion method in which polypropylene is heated and melted to react with carboxylic acid (maleic anhydride, etc.) in the presence of a radical generator, etc., can be exemplified.

In the aforementioned B component and the D component, generally, if the average molecular weight (weight-average molecular weight, etc.) of the polyolefin resin having a carboxyl group decreases, the MFR increases, and if the average molecular weight (weight-average molecular weight, etc.) of the polyolefin resin having a carboxyl group increases, the MFR decreases.

For the aforementioned B component, when the MFR measured at 130° C. is less than 5 g/10 min, the interlaminar strength decreases and the electrolyte resistance becomes poor, and when MFR measured at 130° C. exceeds 42 g/10 min, the interlaminar strength decreases and the electrolyte resistance deteriorates.

The content of the carboxyl group in the aforementioned B component, from the viewpoint of improving the adhesive property, is preferably 0.10 mmol to 2.0 mmol for 1 g of polyolefin resin, especially preferably 0.15 mmol to 1.0 mmol. If the content of the carboxyl group is within the aforementioned suitable range, a greater lamination strength can be secured.

The melting point of the aforementioned B component is preferably 50° C. to 90° C., more preferably 60° C. to 85° C. If the melting point is within the aforementioned suitable range, a great lamination strength can be secured even under high temperature.

The melting point of the aforementioned D component is 120° C. to 170° C., preferably 130° C. to 160° C. When such a D component (polyolefin resin having a carboxyl group and having a melting point of 120° C. to 170° C.) is included, the interlaminar strength can be improved at a high temperature of around 80° C. On the other hand, if the melting point exceeds 170° C., defects in the laminate may occur, and the adhesion temperature at the time of adhesion is required to be set higher, so productivity may deteriorate.

The content of the carboxyl group in the aforementioned D component, from the viewpoint of improving the adhesive property, is preferably 0.01 mmol to 2.0 mmol for 1 g of polyolefin resin, preferably 0.1 mmol to 1.0 mmol. If the content of the carboxyl group is within the aforementioned suitable range, a greater lamination strength can be secured.

The multifunctional isocyanate compound is not especially limited as long as two or more isocyanate groups are included in 1 molecule, and various kinds of isocyanate compounds such as aromatic, aliphatic, and alicyclic isocyanate compounds, as well as modified substances of these isocyanate compounds can be used. As examples, diisocyanate compounds such as toluene diisocyanate (TDI), diphenyl methane diisocyanate, hexamethylene diisocyanate (HDI), isophorone diisocyanate, etc., and a modified substance in which these compounds are isocyanurate-modified, burette modified, or adduct-modified with polyhydric alcohol such as trimethylol propane, etc., and a block type isocyanate in which isocyanate is masked by a block agent and stabilized, etc., can be exemplified. Above all, it is preferable to use a compound in which 3 or more isocyanate groups are included in 1 molecule. For the multifunctional isocyanate compound, only one kind thereof can be used or two or more kinds thereof can be combined. Also, in the first adhesive (processing solution), the multifunctional isocyanate compound is normally dissolved in an organic solvent.

The content rate of the polyolefin resin containing a carboxyl group (B component, D component) in the first adhesive (processing solution) and the multifunctional isocyanate compound is not especially limited, but it is preferable that the equivalent ratio (NCO/OH) of the isocyanate group (NCO) in the multifunctional isocyanate compound and the hydroxyl group (OH) constituting the carboxyl group in the polyolefin resin (B component and D component) is 0.01 to 12.0. If the equivalent ratio (NCO/OH) is 0.01 to 12.0, a first adhesive composition especially excellent in initial adhesive property can be provided, and a cured material (first adhesive layer) having sufficient crosslinking density and flexibility, etc., can be formed. Above all, the equivalent ratio (NCO/OH) is preferably 0.04 to 12.0, more preferably 0.1 to 12.0, especially preferably 0.1 to 9.0. In addition, when only the B component is contained as a polyolefin resin having a carboxyl group, an equivalent ratio=(NCO)/(OH of the B component), and when the B component and the D component are contained as a polyolefin resin having a carboxyl group, an equivalent ratio=(NCO)/(OH of the B component+OH of the D component).

In the case of containing the D component, the content mass ratio of the B component and the D component in the first adhesive (processing solution) is preferably set to as follows when the total of both is 100 mass %. It is preferable that the B component is 1 mass % to 70 mass % and the D component is 99 mass % to 30 mass %, more preferably the B component is 3 mass % to 50 mass % and the D component is 97 mass % to 50 mass %, and especially preferable that the B component is 5 mass % to 40 mass % and the D component is 95 mass % to 60 mass %. Within the aforementioned preferred range, a large lamination strength can be obtained under room temperature (25° C.) and high temperature.

It is preferable that the forming amount of the first adhesive layer (film) 5 formed by the baking treatment is set to 0.5 g/m² to 5.0 g/m² in solid content. By being 0.5 g/m² or more, a sufficient adhesive strength can be obtained, and by being 5.0 g/m² or less, the drying time can be shortened, and it is possible to improve processing efficiency, prevent the solvent from being remained in the packaging material 1, and also improve the moisture barrier properties.

The resin constituting the polypropylene layer (inner layer) (sealant layer) 3 is not especially limited, but for example, 1) a random copolymer resin containing propylene and ethylene as a copolymerization component, 2) a copolymer resin containing propylene, ethylene, and butene as a copolymerization component, and 3) a block copolymer resin containing propylene and ethylene as a copolymerization component, etc., can be exemplified.

An olefin-based thermoplastic elastomer can be blended into the aforementioned 1) to 3) copolymer resins.

As the resin constituting the polypropylene layer (inner layer) 3, it is preferable to use a copolymer resin containing at least propylene and ethylene as copolymerization components and having a melting point of 135° C. to 155° C. A copolymer resin having a melting point of 135° C. to 155° C. means a resin having a peak temperature (melting point) of 135° C. to 155° C. measured by a DSC (differential scanning calorimeter) at a temperature raising rate of 10° C./min. When the melting point is 135° C. or over, sufficient heat resistance can be secured and when the melting point is 155° C. or less, good sealing performance can be secured.

As a resin constituting the polypropylene layer (inner layer) 3, it is preferable to use a copolymer resin containing at least propylene and ethylene as copolymerization components and having a MFR of 6 g/10 min to 25 g/10 min measured at 230° C. When the MFR is 6 g/10 min or more, extrusion lamination can be easily performed, and when the MFR is 25 g/10 min or less, the fluidity of the resin at the time of sealing becomes moderate, thereby making it possible to secure even better sealing performance.

It is preferable that the thickness of the polypropylene layer 3 is 10 μm to 80 μm. When it is 10 μm or more, a sufficient seal strength can be obtained and when it is 80 μm or less, loss of moisture barrier from the end face can be sufficiently prevented. The polypropylene layer 3 can be constituted as a single layer or a multi-layer formed by performing coextrusion of polypropylene or extrusion lamination of polypropylene twice. In the latter case, for example, by arranging a polypropylene layer having a higher fluidity on the outer side (innermost layer side) of the polypropylene layer having a lower fluidity, the seal thickness can be sufficiently prevented from becoming extremely thin due to irregular flow of the polypropylene layers at the time of sealing.

The adhesive constituting the second adhesive layer 11 is not especially limited, but a two-part curing type urethane-based adhesive, etc., containing, for example, a polyol component and an isocyanate component, can be exemplified. This two-part curing type urethane-based adhesive can be suitably used at the time of adhering especially by a dry lamination method. The composition of polyol is not especially limited, but for example, polyester polyol, polyether polyol, etc., can be exemplified. The isocyanate component is not especially limited, but diisocyanate group such as, for example, TDI (tolylene diisocyanate), HDI (hexamethylene diisocyanate), MDI (methylenebis(4,1-phenylene) diisocyanate) can be exemplified. It is preferable that the thickness of the second adhesive layer 11 is 2 μm to 5 μm, and above all, especially preferably 3 μm to 4 μm.

If it is within a range that does not interfere with the effects of the present invention, an anti-blocking agent of inorganic systems and organic systems, and an amide-based slip agent can be added to the inner layer.

By molding (bulging, deep drawing, etc.) the molding packaging material 1 according to the present invention into various shapes such as, for example, a cuboid shape high in molding height, etc., a battery case, a packaging material for food products, and a packaging material for pharmaceutical products can be obtained. In the battery case, the food packaging material, and the pharmaceutical product packaging material obtained by such molding, since contents are prevented from entering between the metal foil layer 4 and the first adhesive layer 5, for a battery case, for example, it is possible to prevent deterioration of the lamination strength due to the influence of electrolytes, and also possible to prevent deterioration of the lamination strength due to heat generation, and expansion/contraction of the packaging material caused by repetition of charging/discharging, which secures sufficient sealing performance.

EXAMPLES

Next, specific examples of the present invention will be explained, but it should be understood that the present invention is not limited to these examples.

Raw Materials (Synthetic Example 1) Polypropylene Resin J Containing a Carboxyl Group Using a twin screw extruder in which the maximum temperature of the cylinder part was set to 170° C., 100 mass parts of a propylene-ethylene random copolymer (MFR: 10 g/10 min, melting point: 85° C.; hereinafter referred to as "propylene-based random copolymer A") made of 97 mol % of propylene unit and 3 mol % of ethylene unit produced using a metallocene catalyst as a polymerization catalyst, 2 mass parts of maleic anhydride, 1 mass part of lauryl methacrylate, and 1.5 mass parts of di-t-butyl peroxide were mixed and reacted. Afterward, the mixture was degassed in the extruder under reduced pressure, and the remaining unreacted material was removed to synthesize a polypropylene resin J containing a carboxyl group (B component.) In the polypropylene resin J containing a carboxyl group, the MFR measured at 130° C. was 12 g/10 min, and the content of the carboxyl group was 0.4 mmol for 1 g of the polypropylene resin (resin J) containing a carboxyl group.

(Synthetic Example 2) Polypropylene Resin K Containing a Carboxyl Group

A polypropylene resin K containing a carboxyl group (B component) was synthesized in the same manner as in Synthetic Example 1 except that a propylene-ethylene random copolymer B (MFR: 5 g/10 min) made of 97 mol % of propylene unit and 3 mol % of ethylene unit produced using a metallocene catalyst as a polymerization catalyst was used instead of the propylene-based random copolymer A. In the polypropylene resin K having a carboxyl group, the MFR measured at 130° C. was 8 g/10 min, and the content of the carboxyl group was 0.4 mmol for 1 g of the polypropylene resin (resin K) containing a carboxyl group.

(Synthetic Example 3) Polypropylene Resin L Containing a Carboxyl Group

A polypropylene resin L containing a carboxyl group (B component) was synthesized in the same manner as in Synthetic Example 1 except that a propylene-ethylene random copolymer C (MFR: 36 g/10 min) made of 97 mol % of propylene unit and 3 mol % of ethylene unit produced using a metallocene catalyst as a polymerization catalyst was used instead of the propylene-based random copolymer A. In the polypropylene resin L containing a carboxyl group, the MFR measured at 130° C. was 40 g/10 min, and the content of the carboxyl group was 0.4 mmol for 1 g of the polypropylene resin (resin K) containing a carboxyl group.

(Synthetic Example 4) Polypropylene Resin X Containing a Carboxyl Group

A polypropylene resin X containing a carboxyl group (B component) was synthesized in the same manner as in Synthetic Example 1 except that a propylene-ethylene random copolymer D (MFR: 1 g/10 min) made of 97 mol % of propylene unit and 3 mol % of ethylene unit produced using a metallocene catalyst as a polymerization catalyst was used instead of the propylene-based random copolymer A. In the polypropylene resin X containing a carboxyl group, the MFR measured at 130° C. was 3 g/10 min, and the content of the carboxyl group was 0.4 mmol for 1 g of the polypropylene resin (resin X) containing a carboxyl group.

(Synthetic Example 5) Polypropylene Resin Y Containing a Carboxyl Group

A polypropylene resin Y containing a carboxyl group (B component) was synthesized in the same manner as in Synthetic Example 1 except that a propylene-ethylene random copolymer E (MFR: 42 g/10 min) made of 97 mol % of propylene unit and 3 mol % of ethylene unit produced using a metallocene catalyst as a polymerization catalyst was used instead of the propylene-based random copolymer A. In the polypropylene resin Y containing a carboxyl group, the MFR measured at 130° C. was 45 g/10 min, and the content of the carboxyl group was 0.4 mmol for 1 g of the polypropylene resin (resin Y) containing a carboxyl group.

(Synthetic Example 6) Polypropylene Resin M Containing a Carboxyl Group

Putting 100 mass parts of a propylene polymer (melting point: 163° C.) and 435 mass parts of toluene into an autoclave having an inner capacity of 1.5 L and provided with a stirring device, the propylene polymer was completely melted by raising the temperature to 140° C. while stirring. While maintaining the solution at 140° C., 16 mass parts of a maleic anhydride and 1.5 mass parts of dicumyl peroxide were each simultaneously dropped for four hours while stirring, and after dropping, they were further stirred for 1 hour at 140° C. to perform post-reaction to thereby obtain a modified polymer. Next, the solution containing the modified polymer was cooled down to room temperature and acetone was added to deposit the modified polymer. After repeatedly washing the deposited modified polymer with acetone, it was dried to collect the modified polymer. For the modified polymer, the graft quantity of the maleic anhydride in the modified polymer was 2.8 mass %, the melting point was 156° C., and the content of the carboxyl group was 0.6 mmol for 1 g of the modified polymer.

Next, 15 mass parts of the obtained modified polymer and 85 mass parts of toluene were put into an autoclave having a stirring device and the modified polymer was completely melted by heating to 130° C. Afterward, after reducing the temperature to 90° C. at a cooling rate of 25° C./hour while stirring, it was cooled to 60° C. at a cooling rate of 5° C./hour. Next, the temperature was lowered to 30° C. at a cooling rate of 20° C./hour to obtain an even, milky-white dispersion liquid P having 15 mass % of solid content (polypropylene resin M having a carboxyl group). In the polypropylene resin M containing a carboxyl group (D component), the melting point measured by a DSC was 156° C.

(Synthetic Example 7) Polypropylene Resin N not Containing Carboxyl Group

Putting 15 mass parts of a propylene-ethylene random copolymer F (MFR: 12 g/10 min) made of 97 mol % of propylene unit and 3 mol % of ethylene unit produced using a metallocene catalyst as a polymerization catalyst and 85 mass parts of toluene into an autoclave having a stirring device, they were heated to 130° C. while stirring to completely melt the copolymer F. Afterward, after reducing the temperature to 90° C. at a cooling rate of 25° C./hour while stirring, it was cooled to 60° C. at a cooling rate of 5° C./hour. Next, the temperature was lowered to 30° C. at a cooling rate of 20° C./hour to obtain an even, milky-white dispersion liquid Q having 15 mass % of a solid content (polypropylene resin N containing no carboxyl group).

Next, Examples 1 to 8 and Comparative Examples 1 to 4 will be explained.

Example 1

A first adhesive E (processing solution) was produced, in which 850 g of toluene (organic solvent: A component), 150 g of a polypropylene resin J containing a carboxyl group (B component) having a MFR of 12 g/10 min measured at 130° C., and 15 g of HDI (multifunctional isocyanate compound: C component) were blended. The content rate of solid content of the first adhesive E was 15 mass %. Also, in the first adhesive E, the B component (polypropylene resin containing a carboxyl group) was dissolved in the toluene of the solvent.

On both surfaces of an aluminum foil 4 having a thickness of 40 μm, a chemical conversion treatment solution including polyacrylic acid, trivalent chrome compound, water, and alcohol was applied and it was dried at 180° C. so that the chromic adhesion amount became 10 mg/m$^2$, and then a biaxially stretched polyamide film (biaxially stretched nylon film) (heat resistant resin layer) 2 having a thickness of 25 μm was dry-laminated on one surface of the aluminum foil 4 using a two-part curing type urethane-based adhesive 11. After the first adhesive E (processing solution) was applied to the other surface 4a of the aluminum foil 4 by a gravure roll method, it was passed through a hot air drying furnace at 200° C. for baking by heating to thereby form a first adhesive layer 5 having an adherence quantity of 2 g/m$^2$ and obtain a laminate 30. Next, as shown in FIG. 2, a propylene-ethylene copolymer resin (the melting point measured by a DSC was 140° C. and the MFR measured at 230° C. was 21 g/10 min) 3× extruded from an extrusion die 20 as an extruder was integrally laminated on a non-laminated surface (the surface to which nothing was laminated) 5a of the first adhesive layer 5 at a thickness of 40 μm to obtain a molding packaging material 1 as shown in FIG. 1.

Example 2

A molding packaging material 1 as shown in FIG. 1 was obtained in the same manner as in Example 1 except that a first adhesive F (processing solution) in which 170 g of toluene (organic solvent: A component), 30 g of polypropylene resin J (B component) containing a carboxyl group in which the MFR measured at 130° C. was 12 g/10 min, 15 g of HDI (multifunctional isocyanate compound: C component), and 800 g of milky-white dispersion liquid P obtained in Synthetic Example 6 (680 g of toluene and 120 g of polypropylene resin M containing a carboxyl group) were compounded, was used instead of the first adhesive E and that the thickness of the extruded propylene-ethylene copolymer resin 3X was set to 80 μm.

Also, in Example 2, the content rate of the solid content in the first adhesive F was 15 mass %. In the first adhesive F (processing solution), the B component was dissolved in toluene as a solvent, but the D component (polypropylene resin M containing a carboxyl group) was not dissolved in toluene but dispersed in toluene.

Example 3

A molding packaging material 1 as shown in FIG. 1 was obtained in the same manner as in Example 1 except that a propylene-ethylene copolymer resin (the melting point measured by a DSC was 155° C. and the MFR measured at 230° C. was 22 g/10 min) was used instead of a propylene-ethylene copolymer resin (the melting point measured by a DSC was 140° C. and the MFR measured at 230° C. was 21 g/10 min) as the extruded resin 3X.

Example 4

A molding packaging material 1 as shown in FIG. 1 was obtained in the same manner as in Example 1 except that a propylene-ethylene copolymer resin (the melting point measured by a DSC was 155° C. and the MFR measured at 230° C. was 25 g/10 min) was used instead of a propylene-ethylene copolymer resin (the melting point measured by a DSC was 140° C. and the MFR measured at 230° C. was 21 g/10 min) as the extruded resin 3X.

Example 5

A molding packaging material 1 as shown in FIG. 1 was obtained in the same manner as in Example 1 except that a polypropylene resin K containing a carboxyl group and having a MFR of 8 g/10 min measured at 130° C. was used instead of a polypropylene resin J containing a carboxyl group and having a MFR of 12 g/10 min measured at 130° C. was used as the B component. In the first adhesive used in Example 5, the polypropylene resin K containing a carboxyl group was dissolved in the toluene of the solvent.

Example 6

A molding packaging material 1 as shown in FIG. 1 was obtained in the same manner as in Example 1 except that a polypropylene resin L containing a carboxyl group and having a MFR of 40 g/10 min measured at 130° C. was used instead of the polypropylene resin J containing a carboxyl group and having a MFR of 12 g/10 min measured at 130° C. was used as the B component. In the first adhesive used in Example 6, the polypropylene resin L containing a carboxyl group was dissolved in the toluene of the solvent.

Example 7

Figure 4:
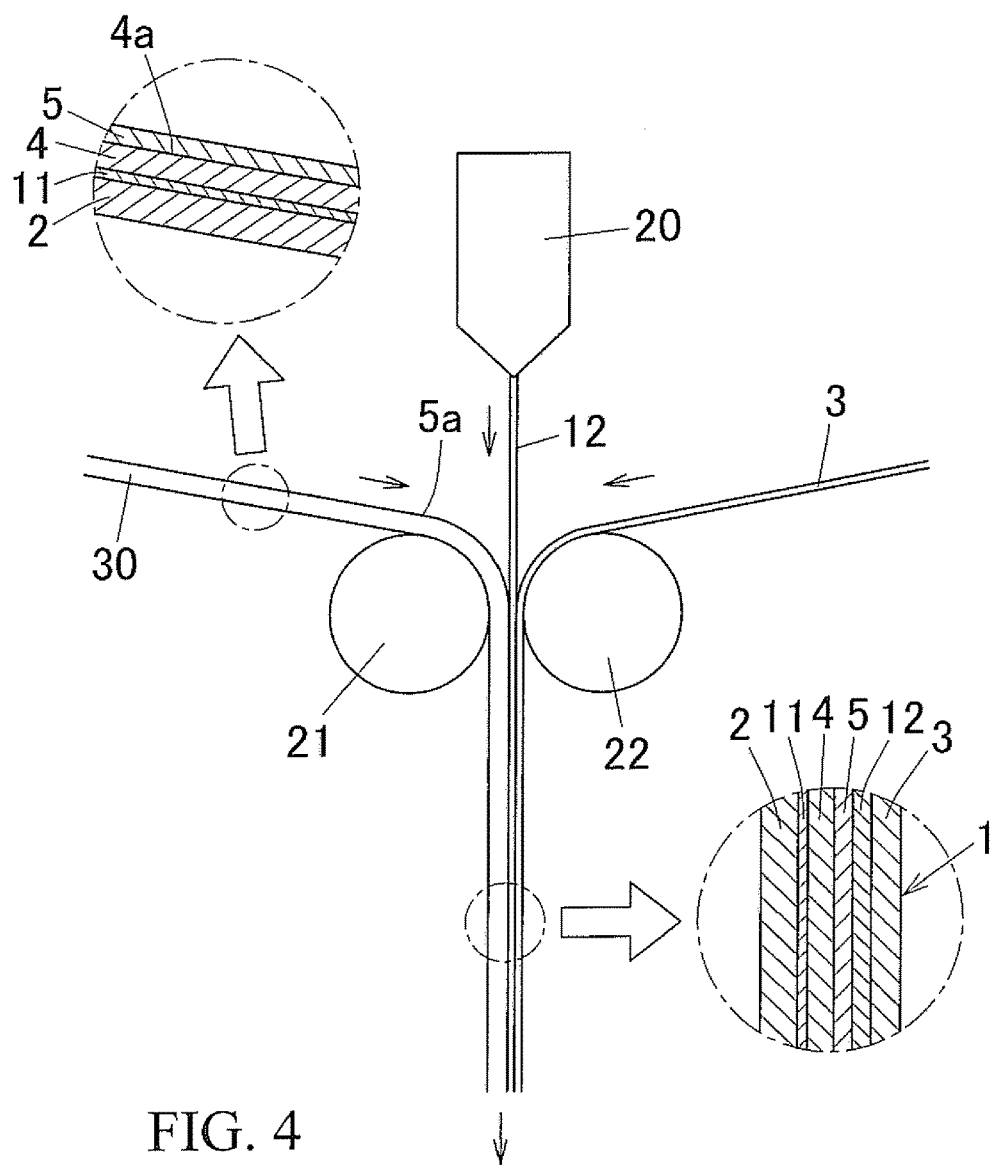
FIG. 4 is a side view showing another example of a production method of a molding packaging material according to the present invention.

On both surfaces of an aluminum foil 4 having a thickness of 40 μm, a chemical conversion treatment solution made of polyacrylic acid, trivalent chrome compound, water, and alcohol was applied and dried at 180° C. so that the chromic adhesion amount became 10 mg/m$^2$. Thereafter, a biaxially stretched polyamide film (biaxially stretched nylon film) (heat resistant resin layer) 2 having a thickness of 25 μm was dry-laminated on one of the surfaces of the aluminum foil 4 using a two-part curing type urethane-based adhesive 11. Then, the first adhesive E (processing solution) used in the aforementioned Example 1 was applied to the other surface 4a of the aluminum foil 4 using a gravure roll method, and thereafter it was passed through a hot air drying furnace at 200° C. for baking by heating to thereby form a first adhesive layer 5 having a quantity of adherence of 2 g/m$^2$ and obtain a laminate 30. Next, as shown in FIG. 4, a propylene-ethylene random copolymer film (the melting point measured by a DSC was 140° C. and the thickness was 60 μm) 3 was integrally laminated by a sandwich lamination method on a non-laminated surface (the surface to which no nothing was laminated) 5a of the first adhesive layer 5 via an extruded polypropylene resin 12 extruded from an extrusion die 20 as an extruder to obtain a molding packaging material 1 as shown in FIG. 1.

Example 8

On both surfaces of an aluminum foil 4 having a thickness of 40 μm, a chemical conversion treatment solution made of polyacrylic acid, trivalent chrome compound, water, and alcohol was applied and dried at 180° C. so that the chromic adhesion amount became 10 mg/m². Thereafter, a biaxially stretched polyamide film (biaxially stretched nylon film) (heat resistant resin layer) 2 having a thickness of 25 μm was dry-laminated on one of the surfaces of the aluminum foil 4 using a two-part curing type urethane-based adhesive 11. Then, the first adhesive E (processing solution) used in the aforementioned Example 1 was applied to the other surface 4a of the aluminum foil 4 using a gravure roll method, it was passed through a hot air drying furnace at 200° C. for baking by heating to thereby form a first adhesive layer 5 having a quantity of adherence of 2 g/m² and obtain a laminate 30. Next, a propylene-ethylene random copolymer film (the melting point measured by a DSC was 140° C. and thickness is 40 μm) was integrally laminated by a heat laminating method (the heat resistant resin layer surface was pinched by and between a pair of heat rolls in a manner such that it contacts the heat roll at 165° C.) on a non-laminated surface (the surface to which nothing was laminated) 5a of the first adhesive layer 5 to obtain a molding packaging material 1 as shown in FIG. 1.

Example 9

A molding packaging material 1 as shown in FIG. 1 was obtained in the same manner as in Example 1 except that a first adhesive P in which 846 g of toluene (organic solvent: A component), 4 g of isopropyl alcohol (organic solvent: A component), 150 g of a polypropylene resin J containing a carboxyl group (B component) and having a MFR of 12 g/10 min measured at 130° C., and 15 g of HDI (multifunctional isocyanate compound: C component) were blended was used instead of a first adhesive E. Also, the content rate of the solid content in the first adhesive P was 15 mass %. Also, in the first adhesive P, the B component (the polypropylene resin containing a carboxyl group) was dissolved in the organic solvent.

Example 10

A molding packaging material 1 as shown in FIG. 1 was obtained in the same manner as in Example 1 except that a first adhesive Q in which 842 g of toluene (organic solvent; A component), 8 g of isopropyl alcohol (organic solvent: A component), 150 g of a polypropylene resin K containing a carboxyl group (B component) and having a MFR of 8 g/10 min measured at 130° C. and 15 g of HDI (multifunctional isocyanate compound: C component) were blended, was used instead of a first adhesive E. The content rate of the solid content in the first adhesive Q was 15 mass %. Also, in the first adhesive Q, the B component (the polypropylene resin containing a carboxyl group) was dissolved in the organic solvent.

Comparative Example 1

A molding packaging material 1 as shown in FIG. 1 was obtained in the same manner as in Example 1 except that a two-part curing type urethane-based first adhesive Z containing a polyol component and an isocyanate component was used instead of the first adhesive E.

Comparative Example 2

A molding packaging material 1 as shown in FIG. 1 was obtained in the same manner as in Example 1 except that a first adhesive W in which 1,000 g of the milky-white dispersion liquid Q obtained in Synthetic Example 7 (850 g of toluene and 150 g of a polypropylene resin N not containing a carboxyl group) and 15 g of HDI (multifunctional isocyanate compound: C component) were blended was used instead of a first adhesive E. Also, in the first adhesive W, the polypropylene resin N not containing a carboxyl group was dispersed in the toluene without being dissolved in the toluene.

Comparative Example 3

A molding packaging material 1 as shown in FIG. 1 was obtained in the same manner as in Example 1 except that a polypropylene resin X containing a carboxyl group and having a MFR of 3 g/10 min measured at 130° C. was used as the B component instead of the polypropylene resin J containing a carboxyl group and having a MFR of 12 g/10 min measured at 130° C.

Comparative Example 4

A molding packaging material 1 as shown in FIG. 1 was obtained in the same manner as in Example 1 except that a polypropylene resin Y containing a carboxyl group and having a MFR of 45 g/10 min measured at 130° C. was used as the B component instead of the polypropylene resin J containing a carboxyl group and having a MFR of 12 g/10 min measured at 130° C.

The melting points described in the descriptions of each of Examples and Comparative Examples were melting points measured at a temperature raising rate of 20° C./min using an automatic differential scanning calorimeter (Product Number: DSC-60A) by Shimadzu Corporation.

Each of the molding packaging material obtained in the aforementioned manner was evaluated based on the following evaluation method. The results are shown in Tables 1 to 3.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Composition of Adhesive (g) | Polypropylene resin J containing a carboxyl group (MFR: 12 g/10 min) | 150 | 30 | 150 | 150 | — | — | 150 | 150 |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
|  | Polypropylene resin K containing a carboxyl group (MFR: 8 g/10 min) | — | — | — | — | 150 | — | — | — |
|  | Polypropylene resin L containing a carboxyl group (MFR: 40 g/10 min) | — | — | — | — | — | 150 | — | — |
|  | Polypropylene resin X containing a carboxyl group (MFR: 3 g/10 min) | — | — | — | — | — | — | — | — |
|  | Polypropylene resin Y containing a carboxyl group (MFR: 45 g/10 min) | — | — | — | — | — | — | — | — |
|  | Polypropylene resin M containing a carboxyl group (melting point: 156° C.) | — | 120 | — | — | — | — | — | — |
|  | Polypropylene resin N containing no carboxyl group | — | — | — | — | — | — | — | — |
|  | Toluene (organic solvent) | 850 | 850 | 850 | 850 | 850 | 850 | 850 | 850 |
|  | Isopropyl alcohol (organic solvent) | — | — | — | — | — | — | — | — |
|  | HDI (multifunctional diisocyanate) | 15 | 15 | 15 | 15 | 15 | 15 | 15 | 15 |
| Equivalent Ratio (NCO group/OH group of polypropylene resin containing a carboxyl group) |  | 1.5 | 1.1 | 1.5 | 1.5 | 1.5 | 1.5 | 1.5 | 1.5 |
| Inner layer | Melting point of resin (° C.) | 140 | 140 | 155 | 155 | 140 | 140 | 140 | 140 |
|  | MFR of resin (g/10 min) | 21 | 21 | 22 | 25 | 21 | 21 | 7 | 10 |
|  | Thickness of resin (μm) | 40 | 80 | 40 | 40 | 40 | 40 | 60 | 40 |
|  | Lamination method | E.L. | E.L. | E.L. | E.L. | E.L. | E.L. | S.L. | H.L. |
| Evaluation | Lamination strength | ◎ | ◎ | ◎ | ◎ | ◎ | ○ | ◎ | ◎ |
|  | Electrolyte-resistance | ◎ | ◎ | ◎ | ◎ | ◎ | ○ | ◎ | ◎ |
|  | Sealing performance | ◎ | ◎ | ◎ | ◎ | ◎ | ○ | ◎ | ◎ |
|  | Storage stability of adhesive | ○ | ○ | ○ | ○ | ○ | ◎ | ○ | ○ |

H.L.: Abbreviation of "Heat Lamination Method"
S.L.: Abbreviation of "Sandwich Lamination Method"
E.L.: Abbreviation of "Extrusion Lamination Method"

TABLE 2

|  |  | Ex. 9 | Ex. 10 |
|---|---|---|---|
| Composition of Adhesive (g) | Polypropylene resin J containing a carboxyl group (MFR: 12 g/10 min) | 150 | — |
|  | Polypropylene resin K containing a carboxyl group (MFR: 8 g/10 min) | — | 150 |
|  | Polypropylene resin L containing a carboxyl group (MFR: 40 g/10 min) | — | — |
|  | Polypropylene resin X containing a carboxyl group (MFR: 3 g/10 min) | — | — |
|  | Polypropylene resin Y containing a carboxyl group (MFR: 45 g/10 min) | — | — |
|  | Polypropylene resin M containing a carboxyl group (melting point: 156° C.) | — | — |
|  | Polypropylene resin N containing no carboxyl group | — | — |
|  | Toluene (organic solvent) | 846 | 842 |
|  | Isopropyl alcohol (organic solvent) | 4 | 8 |
|  | HDI (multifunctional diisocyanate) | 15 | 15 |
| Equivalent Ratio (NCO group/OH group of polypropylene resin containing a carboxyl group) |  | 1.5 | 1.5 |
| Inner layer | Melting point of resin (° C.) | 140 | 140 |
|  | MFR of resin (g/10 min) | 21 | 21 |
|  | Thickness of resin (μm) | 40 | 40 |
|  | Lamination method | E.L. | E.L. |
| Evaluation | Lamination strength | ◎ | ◎ |
|  | Electrolyte-resistance | ◎ | ◎ |
|  | Sealing performance | ◎ | ◎ |
|  | Storage stability of adhesive | ◎ | ◎ |

E.L.: Abbreviation of "Extrusion Lamination Method"

TABLE 3

|  |  | Com. Ex. 1 | Com. Ex. 2 | Com. Ex. 3 | Com. Ex. 4 |
|---|---|---|---|---|---|
| Composition of Adhesive (g) | Polypropylene resin J containing a carboxyl group (MFR: 12 g/10 min) | — | — | — | — |
| | Polypropylene resin K containing a carboxyl group (MFR: 8 g/10 min) | — | — | — | — |
| | Polypropylene resin L containing a carboxyl group (MFR: 40 g/10 min) | — | — | — | — |
| | Polypropylene resin X containing a carboxyl group (MFR: 3 g/10 min) | — | — | 150 | — |
| | Polypropylene resin Y containing a carboxyl group (MFR: 45 g/10 min) | — | — | — | 150 |
| | Polypropylene resin M containing a carboxyl group (melting point: 156° C.) | — | — | — | — |
| | Polypropylene resin N containing no carboxyl group | — | 150 | — | — |
| | Toluene (organic solvent) | — | 850 | 850 | 850 |
| | HDI (Multifunctional diisocyanate) | — | 15 | 15 | 15 |
| Inner layer | Melting point of resin (° C.) | 140 | 140 | 140 | 140 |
| | MFR of resin (g/10 min) | 21 | 21 | 21 | 21 |
| | Thickness of resin (μm) | 40 | 40 | 40 | 40 |
| | Lamination method | E.L. | E.L. | E.L. | E.L. |
| Evaluation | Lamination strength | ○ | X | X | X |
| | Electrolyte-resistance | X | X | Δ | Δ |
| | Sealing performance | ○ | X | X | X |
| | Storage stability of adhesive | — | X | X | ○ |

E.L.: Abbreviation of "Extrusion Lamination Method"

<Evaluation Method of Lamination Strength>

A measurement piece was made by cutting a molding packaging material into 15 mm width and the lamination strength of the measurement piece (the lamination strength of the first adhesive layer 5 and the polypropylene layer (inner layer) 3) was measured in the atmosphere at 80° C. using a tensile testing machine.

(Evaluation Standard)

"⊚" . . . lamination strength was 5 N/15 mm width or more

"○" . . . lamination strength was 3 N/15 mm width or more but less than 5 N/15 mm "X" . . . lamination strength was less than 3 N/15 mm width <Evaluation Method of Electrolyte Resistance>

A molding packaging material was cut into 15 mm width to make measurement pieces, and a solution in which lithium hexafluorophosphate salt was dissolved in a mixed solvent in which ethylene carbonate and diethylene carbonate were mixed at a 1:1 volumetric ratio so that the density became 1 mol/L and the measurement piece were put into a wide-mouthed bottle made of tetrafluoroethylene resin and stored in an oven of 85° C. for one week, and then the measurement piece was taken out therefrom and separated at the interface of the first adhesive layer 5 and the polypropylene layer (inner layer) 3 to measure the lamination strength (adhesive strength) between them.

(Evaluation Standard)

"⊚" . . . The measured adhesive strength had a retention rate of 90% or more for the initial adhesive strength "○" . . . The measured adhesive strength had a retention rate of 60% or more but less than 95% for the initial adhesive strength "Δ" . . . The measured adhesive strength had a retention rate of 30% or more but less than 60% for the initial adhesive strength "X" . . . The measured adhesive strength had a retention rate of less than 30% for the initial adhesive strength (including ones delaminated during immersion)

<Evaluation Method of Sealing Performance>

A seal detachment examination was performed under the condition of 25° C. and 80° C. using a TENSILON RTA-100 made by "Orientec Co., Ltd. product" and a constant temperature tank TCF-III1-B made by "Baldwin Co., Ltd." to evaluate the sealing performance. The sealing condition was performed for each molding packaging material at a seal width of 5 mm, a sealing pressure of 0.3 MPa, a sealing time of 1 second and sealing temperatures of 160° C. and 180° C. by heating both surfaces.

(Sealing Performance Evaluation Standard)

"⊚" . . . a strength of 30 N/15 mm or more was obtained in both cases: sealed at 160° C. and performed a seal detachment examination at 25° C.; and sealed at 180° C. and performed a seal detachment examination at 80° C.

"○" . . . a strength of 25 N/15 mm or more but less than 30 N/15 mm was obtained in both cases: sealed at 160° C. and performed a seal detachment examination at 25° C.; and sealed at 180° C. and performed a seal detachment examination at 80° C.

"X" . . . none of the above (bad sealing performance)

<Evaluation Method of Storage Stability of Adhesive (Processing Solution)>

The storage stability of the first adhesive (processing solution) used in each of Examples and Comparative Examples was evaluated as follows. That is, approximately 100 mL of each of the first adhesives (processing solutions) was put in a glass container having an inner capacity of 110 mL and was rested for 1 month under the temperature condition of 25° C. The condition of the adhesive solution after resting for 1 month was visually observed and evaluated based on the following evaluation standards.

(Evaluation Standard)

"⊚" . . . there was no clouding or thickening and the outer appearance and the condition of the solution did not change from the initial condition (no change: passed)

"○" . . . there was slight clouding or slight thickening, but it maintained fluidity (can be used as an adhesive without problems: passed)

"X" . . . there was clouding and solidification

As it is clear from Tables 1 and 2, the molding packaging material of Examples 1 to 10 of the present invention could have sufficient interlaminar strength and was excellent in electrolyte resistance and sealing performance. Also, the first adhesives used in Examples 1 to 10 were excellent in storage stability.

On the other hand, the molding packaging material of Comparative Example 1 using an urethane-based adhesive as a first adhesive was poor in electrolyte resistance. Also, in the molding packaging material of Comparative Example 2 using a polyolefin resin not having a carboxyl group as a first adhesive was poor in interlaminar strength, electrolyte resistance, and sealing performance. Further, in the molding packaging material of Comparative Examples 3 and 4 that one containing a polyolefin resin having a carboxyl group in which the MFR measured at 130° C. deviated from the range of 5 g/10 min to 42 g/10 min was used as a first adhesive, the interlaminar strength and the sealing performance were poor.

The present invention claims priority to Japanese Patent Application No. 2012-19811 filed on Feb. 1, 2012, the entire disclosure of which is incorporated herein by reference in its entirety.

INDUSTRIAL APPLICABILITY

The molding packaging material according to the present invention can be preferably used as a case for a secondary battery for use in, e.g., laptop computers, mobile phones, automobiles, or for a stationary type lithium ion secondary battery, and also preferably used as a packaging material for, e.g., food products and pharmaceutical products, but it is not especially limited for these usages.

DESCRIPTION OF SYMBOLS

1 . . . Molding packaging material
2 . . . Heat resistant resin layer (outer layer)
3 . . . Polypropylene layer (inner layer)
4 . . . Metal foil layer
4a . . . Chemical conversion treatment surface of the inner side of the metal foil layer
5 . . . Adhesive layer (first adhesive layer)
5a . . . inner surface of adhesive layer
11 . . . second adhesive (layer)

The invention claimed is:

1. A molding packaging material comprising:
a heat resistant resin layer as an outer layer;
a polypropylene layer as an inner layer; and
a metal foil layer arranged between the heat resistant resin layer and the polypropylene layer, wherein
a chemical conversion coating film containing chromium is provided on at least an inner side surface of the metal foil layer, and the polypropylene layer is laminated on the chemical conversion coating film of the metal foil layer via an adhesive layer, the adhesive layer is formed by applying an adhesive to the chemical conversion treatment surface of the inner side of the metal foil layer, the adhesive containing at least an organic solvent, a polyolefin resin having a carboxyl group dissolved in the organic solvent and having an MFR of 5 g/10 min to 42 g/10 min measured at 130° C., and a multifunctional isocyanate compound, and
the polypropylene layer as the inner layer is constituted by a copolymer resin containing at least propylene and ethylene as a copolymerization component, having a melting point of 135° C. to 155° C., and having an MFR of 6 g/10 min to 25 g/10 min measured at 230° C.

2. The molding packaging material as recited in claim 1, wherein the adhesive further contains a polyolefin resin having a carboxyl group and having a melting point of 120° C. to 170° C. in a manner dispersed in the organic solvent.

3. The molding packaging material as recited in claim 1, wherein the adhesive layer is formed by applying the adhesive on the chemical conversion treatment surface of the inner side of the metal foil layer and thereafter subjecting the applied adhesive to a baking treatment.

4. The molding packaging material as recited in claim 1, wherein the molding packaging material is a food packaging material or a pharmaceutical packaging material.

5. The molding packaging material as recited in claim 1, wherein the chemical conversion coating film further contains phosphorus.

6. The molding packaging material as recited in claim 1, wherein the chemical conversion coating film further contains phosphorus and a metal salt of fluoride.

7. The molding packaging material as recited in claim 1, wherein the chemical conversion coating film further contains polyacrylic acid.

8. The molding packaging material as recited in claim 1, wherein the chemical conversion coating film further contains phosphorus and polyacrylic acid.

9. The molding packaging material as recited in claim 1, wherein the copolymer resin constituting the inner layer has an MFR of 21 g/10 min to 25 g/10 min measured at 230° C.

10. A battery case comprising:
the molding packaging material as recited in claim 1.

11. A molding packaging material comprising:
a heat resistant resin layer as an outer layer;
a polypropylene layer as an inner layer; and
a metal foil layer arranged between the heat resistant resin layer and the polypropylene layer, wherein
a chemical conversion coating film containing chromium is provided on at least an inner side surface of the metal foil layer, and the polypropylene layer is laminated on the chemical conversion coating film of the metal foil layer via an adhesive layer,
the adhesive layer is formed by applying an adhesive to the chemical conversion treatment surface of the inner side of the metal foil layer, the adhesive containing at least an organic solvent, a polyolefin resin having a carboxyl group dissolved in the organic solvent and having an MFR of 5 g/10 min to 42 g/10 min measured at 130° C., and a multifunctional isocyanate compound, and
the polyolefin resin having a carboxyl group has a melting point of 50° C. to 90° C.

12. A production method of a molding packaging material, comprising:
a step of adhering a heat resistant resin film on one surface of a metal foil with a second adhesive;
a step of forming a chemical conversion coating film containing chromium on another surface of the metal foil;
a step of forming a first adhesive layer by applying a first adhesive on the chemical conversion coating film of the metal foil, wherein the first adhesive contains at least an organic solvent, a polyolefin resin having a carboxyl group dissolved in the organic solvent and having an MFR of 5 g/10 min to 42 g/10 min measured at 130° C., and a multifunctional isocyanate compound; and a step of laminating a polypropylene layer as an inner layer on a non-laminated surface of the first adhesive layer, wherein the polypropylene layer as the inner layer is constituted by a copolymer resin containing at least propylene and ethylene as a copolymerization component, having a melting point of 135° C. to 155° C., and having an MFR of 6 g/10 min to 25 g/10 min measured at 230° C.

13. The production method of a molding packaging material as recited in claim 12, wherein the first adhesive further contains a polyolefin resin having a carboxyl group and having a melting point of 120° C. to 170° C. in a manner dispersed in the organic solvent.

14. The production method of a molding packaging material as recited in claim 12, wherein after applying the first adhesive, the first adhesive is heated to perform baking to thereby form the first adhesive layer.

\* \* \* \* \*